United States Patent Office 3,506,661
Patented Apr. 14, 1970

3,506,661
MANUFACTURE OF MELAMINE DERIVATIVES
AND PRODUCTS RESULTING THEREFROM
Heinz Werner Enders, Stadtbergen, Augsburg, and Hans
Deiner, Neusass-Lohwald, Germany, assignors to Chemische Fabrik Pfersee, G.m.b.H., Augsburg, Germany, a firm of Germany
No Drawing. Filed Sept. 20, 1966, Ser. No. 580,834
Int. Cl. C07d 55/32; D06m 13/34
U.S. Cl. 260—249.6         5 Claims

ABSTRACT OF THE DISCLOSURE

According to this invention there are manufactured melamine derivatives modified by fatty acid groups which are suitable in the form of solutions or aqueous dispersions for the treatment of textiles as softening agents and particularly for water repellant impregnation, by reacting ethers of fatty acid methylol amides having more than 10 carbon atoms, the methylol groups being etherified by monovalent saturated aliphatic alcohols with 1 to 6 carbon atoms, with highly etherified methylol melamines which contain more than 3 methylol groups at the melamine and the ether residues of which are derived from monovalent saturated aliphatic alcohols with 1 to 6 carbon atoms.

---

This invention relates to the manufacture of melamine derivatives and refers more particularly to a process for producing melamine derivatives modified by fatty acid groups, to products resulting from such process and to the use of such products in organic solution or aqueous emulsion for the treatment of textiles of all types.

It is known in prior art to react while heating methylol derivatives of melamine with 4–6 methylol groups or their ethers with low molecular alcohols, N-methylol amides of higher fatty acids. The resulting products are more or less colorless solid masses. They were suggested in the from of solutions or aqueous dispersions for use, for example, as auxiliary products in the textile industry.

It was found that this manufacturing process has the important drawback in that the resulting products are not uniform, since there is no complete conversion during the reaction, so that unconverted initial substances remain in larger or smaller amounts. Organic solutions of these reaction products tend greatly to settling. Their stability also is only moderate when they are in the form of aqueous dispersions which can be obtained with the addition of emulsifying agents and/or protective colloids, so that after a while deposits are produced. The technical use of the solutions or aqueous dispersions of these products is greatly limited by their lack of stability.

An object of the present invention is to eliminate these prior art drawbacks and to attain a practically complete reaction resulting in uniform products, the organic solutions and aqueous emulsions of which are considerably more stable than those of prior art.

Other objects will become apparent in the course of the following specification.

In the attainment of the objectives of the present invention it was found desirable to use in the reaction etherified fatty acid methylol amides, the ether groups of which are derived from a monovalent saturated aliphatic alcohol with 1 to 6 carbon atoms.

Practical experimentation has indicated the unexpected and surprising result that a reaction wherein etherified fatty acid methylol amide is used results in a much better conversion than when a non-etherified fatty acid methylol amide is used.

In the manufacture of products in accordance with the present invention it is advantageous to introduce into the reaction prepared ethers of a polymethylol melamine, possibly under reduced pressure. It is also possible, however, to produce these ethers during the reaction with the fatty acid methylol amide ethers, in that a mixture of melamine with over-stoichiometric amounts of paraformaldehyde and the corresponding alcohol is reacted at the same time with the fatty acid methylol amide ether. Then the additional use of an acid etherification agent is not necessary. The reaction takes place as much as possible in the absence of water and during the reaction of etherified methylol amide with melamine, paraformaldehyde and alcohol, their excess can serve as solvent and diluting means during the reaction.

Fatty acid methylol amide ethers are produced in the usual way by condensation of fatty acid amide and formaldehyde in the presence of a monovalent saturated aliphatic alcohol with 1–6 carbon atoms with the addition of mineral acids, preferably hydrochloric acid. As far as the used alcohol is concerned, the rule may be that its boiling point should be at least as high as the melting point of the fatty acid methylol amide. Otherwise, when the reaction does not take place in a closed vessel, the alcohol evaporates before the methylol amide is provided in a reaction-capable condition, namely, in a mixable liquid state.

The reaction takes place by heating the mixture in a reflux condenser for 30 minutes to a few hours; after the completion of etherification the product is neutralized, filtered away from the formed salt and freed from the excess of formaldehyde, alcohol and reaction water advantageously under diminished pressure.

The fatty acid methylol amide ethers are derived from fatty acids with more than 10 carbon atoms, namely, particularly from lauric acid, palmitic acid, stearic acid and higher fatty acids. Suitable are also unsatuarted fatty acids or fatty acids substituted by hydroxyl groups, such as undecylenic acid, oleic acid or ricinoleic acid. Obviously, mixture of etherified fatty acid methylol amides can be used as well, whereby the mixture can refere to the fatty acids or also to ether groups of methylol amides.

As other reaction components can be used methylol compounds of the melamine with on the average more than 3, particularly about 6 methylol groups, which are etherified as highly as possible with saturated monovalent aliphatic alcohols with 1 to 6 carbon atoms. Then it is not absolutely necessary that uniform compounds be provided, but it is also possible to introduce mixtures of such etherified formaldehyde condensation products. It is only important that the melamine should contain on the average more than 3 methylol groups and that they be etherified as completely as possible. The fatty acid methylol amide ethers can be reacted with etherified methylol compounds of melamine in any desired mol ratio, although a preferred mol ratio is that of 0.3 to 1 mol fatty acid methylol amide ether to 1 mol melamine.

The products produced in accordance with the present invention are brittle wax-like lightly brown-colored masses which can be dissolved in chlorated hydrocarbons, such as tri-or perchloroethylene, or in benzene, or in aromatic hydrocarbons, such as benzol or toluol, into stable solutions of 50% or more. They are suitable for the treatment of textiles of all types, as softening agents and particularly for water repellant impregnation.

The following examples are given by way of exemplification only:

EXAMPLE 1

3 parts by weight of a hexamethylol melamine extensively etherified by methanol are mixed with 1 part by weight of stearic acid-methylolamide-n-propyl ether, the preparation of which is described hereinafter, in a container provided with a stirrer and a vacuum pump; the mixture is heated to a temperature of about 100° C.

and then is slowly heated during about one hour from 100° C. to 150° C. under diminished pressure, whereupon the reaction mixture is left at about 20 torr for another hour at that temperature.

After cooling a wax-like lightly brown-colored mass is obtained which can be dissolved under heat in toluol to about a 50% solution. When the solution is cooled a light turbidity is apparent which, however, does not lead to any deposits even after standing for several weeks.

It can be easily established that this reaction product contains only insignificant amounts of initial substances, which is not so in the case of an analogous reaction with the equivalent amounts of un-etherified stearic acid methylol amide.

The stearic acid-methylolamide-n-propylether is produced in the following manner:

1600 gr. n-propylalcohol, 570 gr. stearic acid amide and 180 gr. paraformaldehyde are dissolved while being heated, then 200 cc. concentrated hydrochloric acid (about 35%) are added and the mixture is heated for 30 minutes to 90° C. After cooling it is neutralized with sodium carbonate to a pH value of 8, the precipitated sodium chloride is filtered off and then the excess solvent and water are distilled off in vacuum at a temperature of up to 150° C. The resulting product is a lightly brown colored mass which can be used for reaction purposes without any further purification.

EXAMPLE 2

A mixture of 100 parts by weight of lauric acid-methylolamide-n-propylether, 100 parts by weight of melamine, 200 parts by weight of paraformaldehyde and 400 parts by weight of n-propylalcohol are heated while stirring in an apparatus with a descending condenser in such manner that a slow distillation takes place. The process is interrupted as soon as the inner temperature rises above 130° C. and when at the same time a noticeable increase in viscosity can be observed.

The resulting product has properties which are very similar to those of the product produced in accordance with Example 1.

EXAMPLE 3

125 parts by weight of undecylenic acid-methylol amide-isobutyl ether are reacted with 200 parts by weight of hexamethylol-melamine-hexamethyl ether under conditions described in Example 1.

After cooling, a wax-like mass is also produced which is easily soluble in the above-mentioned organic solvents. Such solutions, as well as aqueous emulsions of the product do not produce any disturbing precipitations even after long standing.

The undecylenic acid-methylol amide-isobutyl ether can be produced in a manner similar to that of stearic acid-methylol amide-n-propylether as described in Example 1.

EXAMPLE 4

100 parts by weight of ethylether of stearic acid-methylolamide are stirred with 100 parts by weight of melamine, 180 parts by weight of paraformaldehyde and 400 parts by weight of isopropyl alcohol in a vessel provided with a stirrer and a descending condenser; they are heated slowly to 120° C., until a definite increase in viscosity can be ascertained. The reaction product is then cooled and is diluted with the same amount by weight of toluol. This solution is stable.

The above-described reaction products can be also made into stable aqueous emulsions.

EXAMPLE 5

1 part by weight of hexylether of stearic acid methylolamide and 4,5 parts by weight of hexamethylol-melamine-hexabutylether are heated within 3 hours under diminished pressure to a temperature of 160–170° C. and thereupon the reaction mixture is left for another 3 hours at that temperature.

The resulting product has properties which are very similar to those of the product produced in accordance with Example 1.

It is apparent that the examples described above have been given solely by way of illustration and not by way of limitation and that they are capable of many variations and modifications within the scope of the present invention. All such variations and modifications are to be included within the scope of the present invention.

What is claimed is:

1. The process of manufacturing melamine derivatives modified by fatty acid groups, which comprises reacting:
   (A) ethers of fatty acid methylol amides derived from fatty acids with more than 10 carbon atoms, the methylol groups being etherified by monovalent saturated aliphatic alcohols with 1–6 carbon atoms, while heating, with
   (B) highly ethereified methylol melamines which contain more than 3 methylol groups at the melamine and the ether residues of which are derived from monovalent saturated aliphatic alcohols with 1–6 carbon atoms.

2. The process in accordance with claim 1, wherein during said reaction of ethers of fatty acid methylol amides with ethereified methylol melamines, said etherified methylol melamines are formed only in situ from melamine, paraformaldehyde and monovalent saturated aliphatic alcohol with 1–6 carbon atoms by adding formaldehyde and alcohol in amounts substantially in excess of amounts necessary for the complete methylolation and complete etherification of methylol groups, and distilling off the excess of formaldehyde and alcohol during said heating.

3. The process in accordance with claim 1, wherein the highly etherified methylol melamine contain 6 methylol groups at the melamine.

4. The process in accordance with claim 1, wherein etherified methylolamides of unsaturated fatty acids are reacted.

5. The process in accordance with claim 1, wherein etherified methylolamides of fatty acids substituted by hydroxyl groups are reacted.

References Cited

UNITED STATES PATENTS

| | | | |
|---|---|---|---|
| 2,918,452 | 12/1959 | Kun et al. | 260—249.6 XR |
| 3,160,608 | 12/1964 | Polansky et al. | 260—249.6 XR |
| 3,322,762 | 5/1967 | Erikson et al. | 260—249.6 |
| 3,010,849 | 11/1961 | Lense | 117—139.5 |
| 3,020,255 | 2/1962 | Magrane et al. | 260—249.6 XR |
| 3,145,207 | 8/1964 | Wohnsiedler | 260—249.6 |
| 3,352,838 | 11/1967 | Toepfl et al. | 260—249.6 XR |
| 3,356,526 | 12/1967 | Waldman et al. | 117—139.5 XR |

NORMA S. MILESTONE, Primary Examiner

J. M. FORD, Assistant Examiner

U.S. Cl. X.R.

260—256.4, 999